April 14, 1964 P. E. BOWEN 3,128,868
MAGNETIC 6 PACK TURNING DEVICE
Filed Aug. 1, 1960
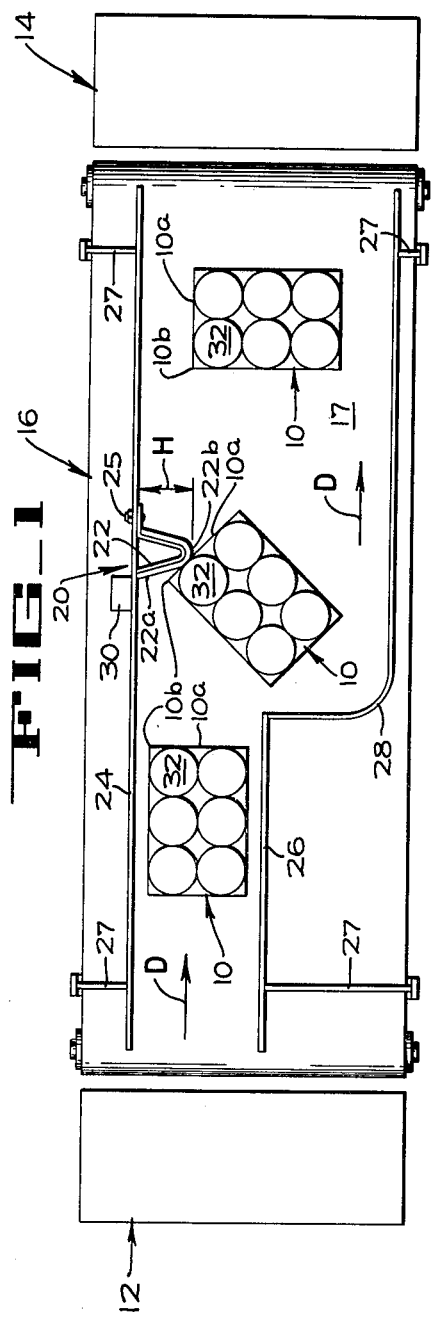
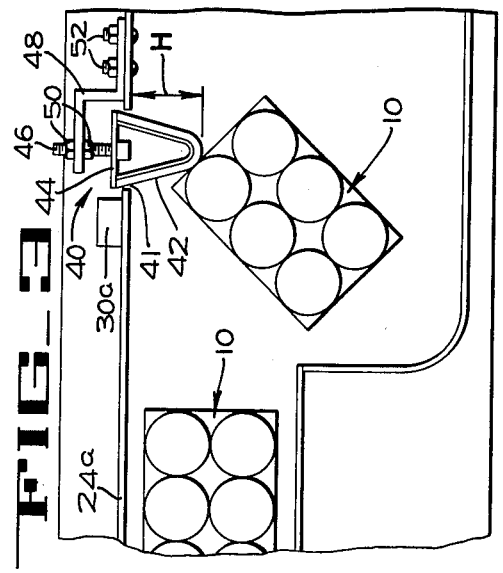
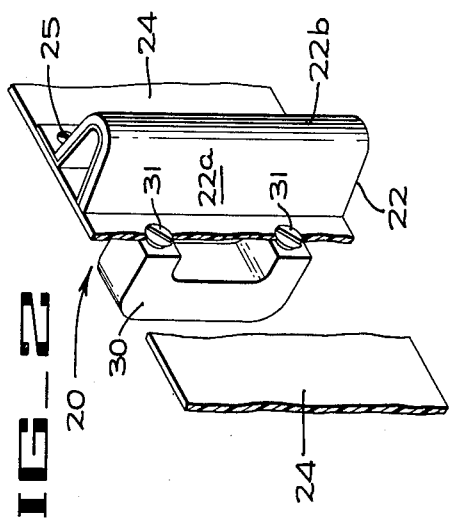
INVENTOR
PHILIP E. BOWEN
BY Hans G. Hoffmeister
ATTORNEY

United States Patent Office 3,128,868
Patented Apr. 14, 1964

3,128,868
MAGNETIC 6 PACK TURNING DEVICE
Philip Eugene Bowen, Paxton, Ill., assignor to FMC
Corporation, a corporation of Delaware
Filed Aug. 1, 1960, Ser. No. 46,710
1 Claim. (Cl. 198—33)

The present invention relates to conveyors and more particularly concerns apparatus for orienting articles moving on a conveyor.

When articles are to be packed automatically in cases a difficulty sometimes arises from the fact that the machine which supplies the articles discharges them onto a conveyor so oriented that they are unacceptable to the casing machine. The articles can, of course, be reoriented by hand, and complicated machinery is sometimes used, but these solutions have not proven satisfactory.

An object of the invention is to provide an improved orienting device for use with a conveyor.

Another object of the invention is to provide an orienting device which operates positively and dependably and is inexpensive to manufacture.

Another object of the invention is to provide an orienting apparatus for use with a conveyor which apparatus is adjustable to vary the time required to orient an article.

These and other objects and advantages of the invention will become apparent from the following description and the accompanying drawing in which:

FIGURE 1 is a diagrammatic top plan of a conveyor having the orienting device of the invention operatively associated therewith.

FIGURE 2 is a partially broken away perspective of the orienting device of FIG. 1.

FIGURE 3 is an enlarged fragmentary plan similar to FIG. 1, and illustrating a modified form of the orienting device of the invention.

The orienting device of the present invention is illustrated in the drawings as being employed to orient packages such as the commonly known "six-pack" cardboard packages, each of which contains six cans of beer or other commodity. FIGURE 1 is a diagrammatic illustration of a packaging apparatus wherein rectangular six-pack packages 10 originate at a can-packaging unit 12 (FIG. 1) and are transported to a casing machine 14 by means of a horizontal endless-belt conveyor 16. The rectangular packages 10 are discharged by the packaging unit 12 with their long dimension parallel to the direction of movement indicated by the arrow D of the upper run 17 of the conveyor 16. If the packages were to maintain this orientation as they enter the casing machine 14, the casing machine would be unable to properly load them into cases.

The casing machine 14 is so constructed that the packages 10 which it receives must be oriented with their short dimension parallel to their direction of movement. The required reorientation or 90° turning of each of the packages 10 is performed by the turning device 20 of the present invention.

The turning device 20 (FIG. 1) comprises a rubber-covered sheet-metal bumper 22 (FIGS. 1 and 2) which is attached to a guide rail 24 of the conveyor by bolts 25 or other suitable fasteners. The bumper 22 is substantially V-shaped in plan, and is mounted with its apex pointing away from the guide rail 24. The face 22a of the bumper which is first contacted by a package advancing on the conveyor 16 is inclined at an angle of less than 90° with respect to the direction of package advance and consequently, the first contact of the package against the bumper 22 occurs at one corner of the package. The line of first contact, therefore, immediately becomes an immobilized pivot axis, and since the entire mass of the package is offset therefrom in the direction away from the guide rail 24, the package is caused to turn away from the guide rail 24, as illustrated in FIG. 1. The bumper is so proportioned that it extends less than half-way across the front end 10a of the package, so that even when the package has turned far enough to dispose its end 10a parallel to and thus flat against the face 22a of the bumper, the conveyor 16 continues to impose a turning movement upon the package, which prevails until the package has turned a full 90°, or until its end 10a is parallel to the direction in which the conveyor exerts its propelling force against the package. When this position of the package has been achieved, the bumper ceases to exert any restraining force against the package which, therefore, then moves on past the bumper with its ends parallel to the direction of its movement.

The outer end 22b of the bumper 22 is rounded as clearly shown in FIG. 1, with the result that the turning package pivots around the bumper in a rolling motion, i.e., about a pivot axis that advances until it arrives at the extreme outer end of the bumper, which of course, occurs when the end 10a of the package becomes parallel to the direction in which the conveyor 16 exerts its force against the package.

The V-shaped bumper 22 is symmetrical about a vertical plane so that it can be rotated 180° when one rubber-covered face becomes worn.

The distance H (FIG. 1) that the bumper 22 projects into the path of a package determines the time required to rotate the package; rotation time increasing as H increases. It is desirable, therefore, that H be kept small. However, with the H dimension small there is a greater possibility that the leading corner 10a of the package will fail to engage the bumper in which event, of course, the package will not be turned.

The guide rail 24 and a second guide rail 26 are supported on frame members 27 a short distance above the upper run 17 of the conveyor. The guide rail 26 can be adjusted toward the rail 24 to assure that the advancing packages 10 are close to the stationary guide rail 24 and are substantially longitudinally aligned with the direction of conveyor movement as they approach the turning device 20. The guide rail 26 is curved outwardly as at 28 to accommodate the packages as they are turned.

A magnet 30 (FIGS. 1 and 2) attached to the guide rail 24 beside the bumper 22 by means of screws 31 (FIG. 2) is used to attract the can 32 in the leading corner 10b of the package, it being understood that the cans 32 within the package are made of paramagnetic material, e.g., ferrous metal. The magnet 30 may be either a permanent magnet or a suitably energized electromagnet, and in order to attain maximum efficiency of the magnet 30, the guide rail 24, or at least the region thereof, wherein the magnet 30 is attached, is composed of suitable diamagnetic material, e.g., sheet plastic. The attraction of the corner can 32 to the magnet 30 ensures that the package will continue to properly engage the bumper after the initial contact and the magnet tends to maintain the package in engagement with the bumper as it is being rotated. The magnet thus sustains the engagement and ensures that each package is properly reoriented even though the H dimension of the bumper is small.

Bumpers 22 having differing H dimensions can be fastened to the guide rail 24 for providing variation in the package turning time. FIG. 3 illustrates a modified form of turning bumper having provision for adjusting the H dimension. The turning device 40 having an adjustable H dimension (FIG. 3) is located in a gap 41 in the guide rail 24a and comprises a smoothly curved rubber-covered sheet-metal bumper 42 having a backing plate 44 welded thereto. Vertically aligned bolts 46 (only one being shown, FIG. 3) are fastened to the backing plate 44 and the bolts include threaded shanks which extend through suitable holes in a bracket 48. A pair of nuts 50 on each bolt 46 can be adjusted to vary the distance H that the bumper 42 projects into the path of the approaching package 10. The bracket 48 is attached to the guide rail 24a by bolts 52. The holes in the guide rail 24a which accommodate bolts 52 can be horizontal slots if it is desired to provide for adjustment of the bumper 42 toward or away from the magnet 30a. The bumper 42 is symmetrical about a vertical plane and it therefore can be rotated 180° when one rubber-covered face is worn.

It will be apparent from the foregoing description that the purpose of the magnet 30 is to increase the rate at which articles such as ferrous-metal-containing packages can be reoriented; any rectangular package or article can be reoriented by properly adjusting the H dimension of the bumper of the turning device 20 or 40, without a magnet being required.

By way of further explanation, correct turning is obtained by a combination of bumper design and magnet placement. Because of the centrifugal forces acting on the pack during turning, the pack tends to be thrown away from the bumper and to slip outwardly therefrom so that it is not turned through a full 90°. As previously indicated, the shape of the present bumper is designed so that the initial turning is a pivotal action made while the pack corner forms a sharp line contact with the bumper. Slippage is not likely to occur at this stage because of the large pressure with which this contact is made, nevertheless, any tendency to slip is counteracted even at this stage by the pull of the magnet. Slip tends to occur, however, at the transition from the pivotal movement about the pack corner to the rolling movement of the pack around the bumper, and it is this slippage that the magnet prevents, with the assistance of the high coefficient of friction of the rubber coating of the bumper, by counteracting the centrifugal forces. Finally, it will be noted that the placement of the magnet does not tend to inhibit the transition from the pivotal to the rolling movement, nor does it significantly slow the motion of the pack down as it is turned; rather, the magnet opposes the centrifugal forces which prevent correct turning of the article by the normal conveyor movement.

While two particular embodiments of the present invention have been shown and described it will be understood that the device is capable of further modification and variation without departing from the principles of the invention and that the scope of the invention should be limited only by the scope and proper interpretation of the claims appended hereto.

The invention having thus been described, that which is believed to be new and desired to be protected by Letters Patent is:

Apparatus for turning rectilinear articles having ferromagnetic portions comprising, in combination: a conveyor having a substantially horizontal conveying surface for supporting and advancing said articles; a guide rail extending along one side of said conveying surface and having an inner face facing said surface and an outer face facing away from said surface; a bumper secured to the inner face guide rail and extending from said guide rail over the conveying surface; a substantially planar abutment surface defining the upstream side of the bumper and upstanding substantially perpendicularly from the plane of the conveying surface, said abutment surface comprising an inner portion and an outer portion and being formed from resilient material having a high coefficient of friction, the inner abutment surface portion lying closest to the rail, being substantially planar and forming an acute downstream angle with the rail and the outer abutment surface portion being part-cylindrical and arranged so that said inner portion joins the outer portion tangentially; and a magnet fixed to the guide rail outwardly of said inner face immediately upstream from said bumper and arranged to attract an article to be turned so that a corner of the article will strike the inner abutment surface portion near the guide rail to make line contact therewith and arranged to oppose the centrifugal forces acting on said article as it pivots about said line contact, abuts said inner surface portion and rolls around said outer portion while being frictionally advanced by said conveyor surface past said abutment, slippage between said abutment and said article thereby being substantially prevented.

References Cited in the file of this patent

UNITED STATES PATENTS

| | | |
|---|---|---|
| 2,449,422 | Schmidt | Mar. 7, 1950 |
| 2,805,753 | Palmer | Sept. 10, 1957 |
| 2,963,143 | Field | Dec. 6, 1960 |